United States Patent
Dube et al.

(10) Patent No.: US 12,437,190 B2
(45) Date of Patent: Oct. 7, 2025

(54) AUTOMATED FINE-TUNING OF A PRE-TRAINED NEURAL NETWORK FOR TRANSFER LEARNING

(71) Applicant: International Business Machines Corporation, Armonk, NY (US)

(72) Inventors: Parijat Dube, Yorktown Heights, NY (US); Bishwaranjan Bhattacharjee, Yorktown Heights, NY (US); Patrick Watson, Montrose, NY (US); John Ronald Kender, Leonia, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 796 days.

(21) Appl. No.: 16/704,804

(22) Filed: Dec. 5, 2019

(65) Prior Publication Data
US 2021/0174191 A1    Jun. 10, 2021

(51) Int. Cl.
G06N 3/08  (2023.01)
G06F 17/18  (2006.01)
G06N 20/10  (2019.01)

(52) U.S. Cl.
CPC .............. *G06N 3/08* (2013.01); *G06F 17/18* (2013.01); *G06N 20/10* (2019.01)

(58) Field of Classification Search
CPC ........ G06N 3/08; G06N 3/0454; G06N 20/10; G06F 17/18
See application file for complete search history.

(56) References Cited

U.S. PATENT DOCUMENTS

| | | | |
|---|---|---|---|
| 6,269,351 B1 | 7/2001 | Black | |
| 7,203,635 B2 | 4/2007 | Oliver et al. | |
| 10,592,776 B2 | 3/2020 | Diverdi et al. | |
| 11,196,830 B2* | 12/2021 | Desai | H04L 67/12 |

(Continued)

FOREIGN PATENT DOCUMENTS

| | | | |
|---|---|---|---|
| CN | 104616033 A | 5/2015 | |
| CN | 108508473 A * | 9/2018 | G01T 1/003 |

(Continued)

OTHER PUBLICATIONS

T. Schaul and et al, "No More Pesky Learning Rates", Proceedings of the 30 th International Conference on Machine Learning, Atlanta, Georgia, USA, 2013. JMLR: W&CP vol. 28 (Year: 2013).*

(Continued)

*Primary Examiner* — Douglas Kay
(74) *Attorney, Agent, or Firm* — Garg Law Firm, PLLC; Rakesh Garg; James Olsen

(57) ABSTRACT

In an embodiment, a method for fine-tuning a pre-trained neural network for transfer learning, the method comprising obtaining a first target feature vector from a first layer of a pre-trained neural network responsive to a first target data element of a target dataset passing therethrough, obtaining a first source feature vector associated with the first layer of the pre-trained neural network, calculating a first divergence value for the first layer of the pre-trained neural network based at least in part on the first target feature vector and the first source feature vector, and setting a learning rate for the first layer of the pre-trained neural network based at least in part on the first divergence value.

15 Claims, 5 Drawing Sheets

(56) References Cited

U.S. PATENT DOCUMENTS

| | | | |
|---|---|---|---|
| 2005/0125368 | A1 | 6/2005 | Akahori |
| 2009/0141969 | A1 | 6/2009 | Yu et al. |
| 2016/0026925 | A1 | 1/2016 | Bouchard et al. |
| 2016/0140425 | A1 | 5/2016 | Kulkarni et al. |
| 2016/0253597 | A1 | 9/2016 | Bhatt et al. |
| 2017/0316281 | A1 | 11/2017 | Criminisi et al. |
| 2017/0347110 | A1 | 11/2017 | Wang et al. |
| 2018/0242017 | A1 | 8/2018 | Van et al. |
| 2018/0341872 | A1 | 11/2018 | Wang et al. |
| 2019/0034407 | A1 | 1/2019 | Hagiwara et al. |
| 2019/0050890 | A1 | 2/2019 | Liu et al. |
| 2019/0087726 | A1 | 3/2019 | Greenblatt et al. |
| 2019/0138895 | A1 | 5/2019 | Jin et al. |
| 2019/0147304 | A1* | 5/2019 | Liu ............... G06F 18/2148 382/157 |
| 2019/0325299 | A1 | 10/2019 | Oliveira Pinheiro |
| 2019/0332933 | A1* | 10/2019 | Qiao ............... G06N 3/084 |
| 2019/0333198 | A1* | 10/2019 | Wang ............... G06T 5/50 |
| 2019/0354850 | A1* | 11/2019 | Watson ............... G06N 3/08 |
| 2020/0082210 | A1* | 3/2020 | Watson ............... G06F 16/51 |
| 2020/0134461 | A1* | 4/2020 | Chai ............... G06N 3/10 |
| 2020/0167930 | A1 | 5/2020 | Wang et al. |
| 2020/0410324 | A1* | 12/2020 | Trim ............... G06N 5/022 |
| 2021/0224977 | A1* | 7/2021 | Jia ............... G06F 18/24 |
| 2022/0004855 | A1* | 1/2022 | He ............... G06N 3/063 |
| 2022/0198779 | A1* | 6/2022 | Saraee ............... G06Q 50/01 |
| 2022/0362767 | A1* | 11/2022 | Kashkin ............... B01L 3/502715 |
| 2023/0298312 | A1* | 9/2023 | Saraee ............... G06V 10/761 382/157 |

FOREIGN PATENT DOCUMENTS

| | | | | |
|---|---|---|---|---|
| CN | 109508385 | A | * 3/2019 | |
| CN | 110503204 | A | 11/2019 | |
| CN | 108765383 | B | * 3/2022 | ........... G06T 7/0002 |
| CN | 111898634 | B | * 8/2022 | ........... G06K 9/6256 |

OTHER PUBLICATIONS

H. Luo and S. Hangud, "Dynamic Learning Rate Neural Network Training and Composite Structural Damage Detection", AIAA Journal, vol. 35, No. 9, Sep. 1997 (Year: 1997).*

S. Di, H. Zhang, C.-G. Li, X. Mei, D. Prokhorov and H. Ling, "Cross-Domain Traffic Scene Understanding: A Dense Correspondence-Based Transfer Learning Approach," in IEEE Transactions on Intelligent Transportation Systems, vol. 19, No. 3, pp. 745-757, Mar. 2018, doi: 10.1109/TITS.2017.2702012 (Year: 2018).*

Zhu J, and et al. A new deep transfer learning method for bearing fault diagnosis under different working conditions. IEEE Sensors Journal. Aug. 22, 2019;20(15):8394-402 (Year: 2019).*

An Z, and et al. Generalization of deep neural network for bearing fault diagnosis under different working conditions using multiple kernel method. Neurocomputing. Aug. 4, 2019;352:42-53 (Year: 2019).*

Li Y, and et al. Adaptive batch normalization for practical domain adaptation. Pattern Recognition. Aug. 1, 2018;80:109-17 (Year: 2018).*

Kim J, and et al. Accurate image super-resolution using very deep convolutional networks. In Proceedings of the IEEE conference on computer vision and pattern recognition 2016 (pp. 1646-1654) (Year: 2016).*

Moreira M, Fiesler E. Neural networks with adaptive learning rate and momentum terms. Idiap; 1995 (Year: 1995).*

Dong, Chao, and et al. "Image super-resolution using deep convolutional networks." IEEE transactions on pattern analysis and machine intelligence 38, No. 2 (2015): 295-307 (Year: 2015).*

Long, Mingsheng, Han Zhu, Jianmin Wang, and Michael I. Jordan. "Deep transfer learning with joint adaptation networks." In International conference on machine learning, pp. 2208-2217. PMLR, 2017 (Year: 2017).*

Zeiler, Adadelta: An Adaptive Learning Rate Method, 2012.

Salakhutdinov et al., Deep Boltzmann Machines, Artificial intelligence and statistics, Apr. 2009, pp. 448-455, Clearwater Beach, Florida, USA. vol. 5 of JMLR:W&CP 5.

Garcia-Gasulla et al., On the Behavior of Convolutional Nets for Feature Extraction, Journal of Artificial Intelligence Research (JAIR), Special Track on Deep Learning, Knowledge Representation, and Reasoning, Mar. 3, 2017, https://arxiv.org/abs/1703.01127.

Ravaut et al., Faster gradient descent via an adaptive learning rate, 2019, http://www.cs.toronto.edu/~mravox/p4.pdf.

List of all IBM related dockets, Appendix P, 2019.

Ammar et al., "An Automated Measure of MDP Similarity for Transfer in Reinforcement Learning", Jul. 2014, Conference: Workshops at the Twenty-Eighth AAAI Conference on Artificial Intelligence (Year: 2014), 08 pages.

Auer, et al., DBpedia: A Nucleus for a Web of Open Data, In In 6th Int'l Semantic Web Conference, 2007, 15 pages.

Azizpour, et al., Factors of Transferability for a Generic ConvNet Representation, Jul. 15, 2015, 12 Pages.

Bengio, Deep Learning of Representations for Unsupervised and Transfer Learning, Workshop on Unsupervised and Transfer Learning, 2012, pp. 17-37, vol. 27.

Bottou, Stochastic Gradient Descent Tricks, Neural Networks Tricks of the Trade Reloaded, 2012, 16 Pages.

Dai, et al., Boosting for Transfer Learning, The 24th International Conference on Machine Learning, 2007, 08 Pages.

Das, et al., Document Image Classification with Intra-Domain Transfer Learning and Stacked Generalization of Deep Convolutional Neural Networks, Jan. 29, 2018, 7 Pages.

Deng, et al., ImageNet: A Large-Scale Hierarchical Image Database, IEEE Conference on CVPR, 2009, 8 Pages.

Finn, et al., Model-Agnostic Meta-Learning for Fast Adaptation of Deep Networks, International Conference on Machine Learning, 2017, 13 pages.

Ge, et al., Borrowing Treasures from the Wealthy: Deep Transfer Learning through Selective Joint Fine-tuning, Jun. 6, 2017, 10 pages.

Glass, et al., A Dataset for Web-scale Knowledge Base Population, Proceedings of the 15th Extended Semantic Web Conference, 2018, 15 pages.

He, et al., Deep Residual Learning for Image Recognition, IEEE Conference on CVPR, 2016, 9 Pages.

He, Xiangteng et al., "Fine-grained image classification via combining vision and language." Proceedings of the IEEE conference on computer vision and pattern recognition. (Year: 2017).

Jia, et al., Caffe: Convolutional Architecture for Fast Feature Embedding, ACM Multimedia, 2014, 4 Pages.

Kullback, et al., On Information and Sufficiency, The Annals of Mathematical Statistics, Mar. 1951, pp. 79-86, vol. 22, No. 1.

Li, et al., G-Distillation: Reducing Overconfident Errors on Novel Samples, arXiv: 1804.03166v1 [cs.CV], Apr. 9, 2018, 20 pages.

Lin, et al., Network In Network, Mar. 4, 2014, 10 Pages.

Long, Mingsheng, et al. "Deep transfer learning with joint adaptation networks." International conference on machine learning. PMLR, (Year: 2017).

Luo, et al., Label Efficient Learning of Transferable Representations across Domains and Tasks, 31st Conference on Neural Information Processing Systems, 2017, 13 pages.

Mel, et al., The NIST Definition of Cloud Computing, National Institute of Standards and Technology Special Publication 800-145, Sep. 2011, 7 Pages.

Mikolov, et al., Distributed Representations of Words and Phrases and their Compositionality, Oct. 16, 2013, 9 Pages.

Mou, et al., How Transferable are Neural Networks in NLP Applications?, Proceedings of the 2016 Conference on Empirical Methods in Natural Language Processing, Nov. 5, 2016, pp. 479-489.

Nan, et al., Adaptive Classification for Prediction Under a Budget, In Advances in Neural Information Processing Systems 30 (NIPS 2017), May 26, 2017, 11 pages.

Nguyen, et al., A Two-stage Approach for Extending Event Detection to New Types via Neural Networks, Proceedings of the 1st Workshop on Representation Learning for NLP, Aug. 11, 2016, pp. 158-165.

(56) References Cited

OTHER PUBLICATIONS

Nikolaos, et al., Sampling Algorithms to Handle Nuisances in Large-Scale Recognition, UCLA Electronic Theses and Dissertations, Jan. 1, 2017, 154 pages.
Pan, et al., A Survey on Transfer Learning, IEEE Transactions on Knowledge and Data Engineering, 2010, 15 Pages.
Simonyan, et al., Very Deep Convolutional networks for large-scale image recognition, International Conference on Learning Representations, Apr. 10, 2015, 14 Pages.
Vincent, et al., Stacked Denoising Autoencoders: Learning Useful Representations in a Deep Network with a Local Denoising Criterion, Journal of Machine Learning Research, Dec. 2010, pp. 3371-3408.
Volpi, Riccardo, et al. "Adversarial feature augmentation for unsupervised domain adaptation." Proceedings of the IEEE conference on computer vision and pattern recognition. (Year: 2018).
Wei, Yunchao, et al. "CNN: Single-label to multi-label." arXiv preprint arXiv: 1406.5726 (Year: 2014).
Xia, et al., Dual Supervised Learning, arXiv:1707.00415v1 [cs.LG], Jul. 3, 2017, 11 pages.
Yang, et al., Building Optimal Information Systems Automatically: Configuration Space Exploration for Biomedical Information Systems, ACM, Oct. 27, 2013, pp. 1421-1430.
Yim et al., "A Gift from Knowledge Distillation: Fast Optimization, Network Minimization and Transfer Learning." Proceedings of the IEEE conference on computer vision and pattern recognition (Year: 2017).
Yosinski, et al., How transferable are features in deep neural networks?, NIPS, 2014, 22 pages.
Zamir et al., Taskonomy: Disentangling Task Transfer Learning. arXiv:1804.08328. (Apr. 23, 2018) (Year: 2018).
Zeng, et al., Distant Supervision for Relation Extraction via Piecewise Convolutional Neural Networks, Proceedings of the 2015 Conference on Empirical Methods in Natural Language Processing, Sep. 21, 2015, pp. 1753-1762.

\* cited by examiner

AUTOMATED FINE-TUNING OF A PRE-TRAINED NEURAL NETWORK FOR TRANSFER LEARNING

TECHNICAL FIELD

The present invention relates generally to a method, system, and computer program product for neural networks. More particularly, the present invention relates to a method, system, and computer program product for automated fine-tuning of a pre-trained neural network for transfer learning.

BACKGROUND

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

SUMMARY

The illustrative embodiments provide for automated fine-tuning of a pre-trained neural network. An embodiment includes obtaining a first target feature vector from a first layer of a pre-trained neural network responsive to a first target data element of a target dataset passing therethrough. The embodiment also includes obtaining a first source feature vector associated with the first layer of the pre-trained neural network. The embodiment further includes calculating a first divergence value for the first layer of the pre-trained neural network based at least in part on the first target feature vector and the first source feature vector. The embodiment further includes setting a learning rate for the first layer of the pre-trained neural network based at least in part on the first divergence value.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
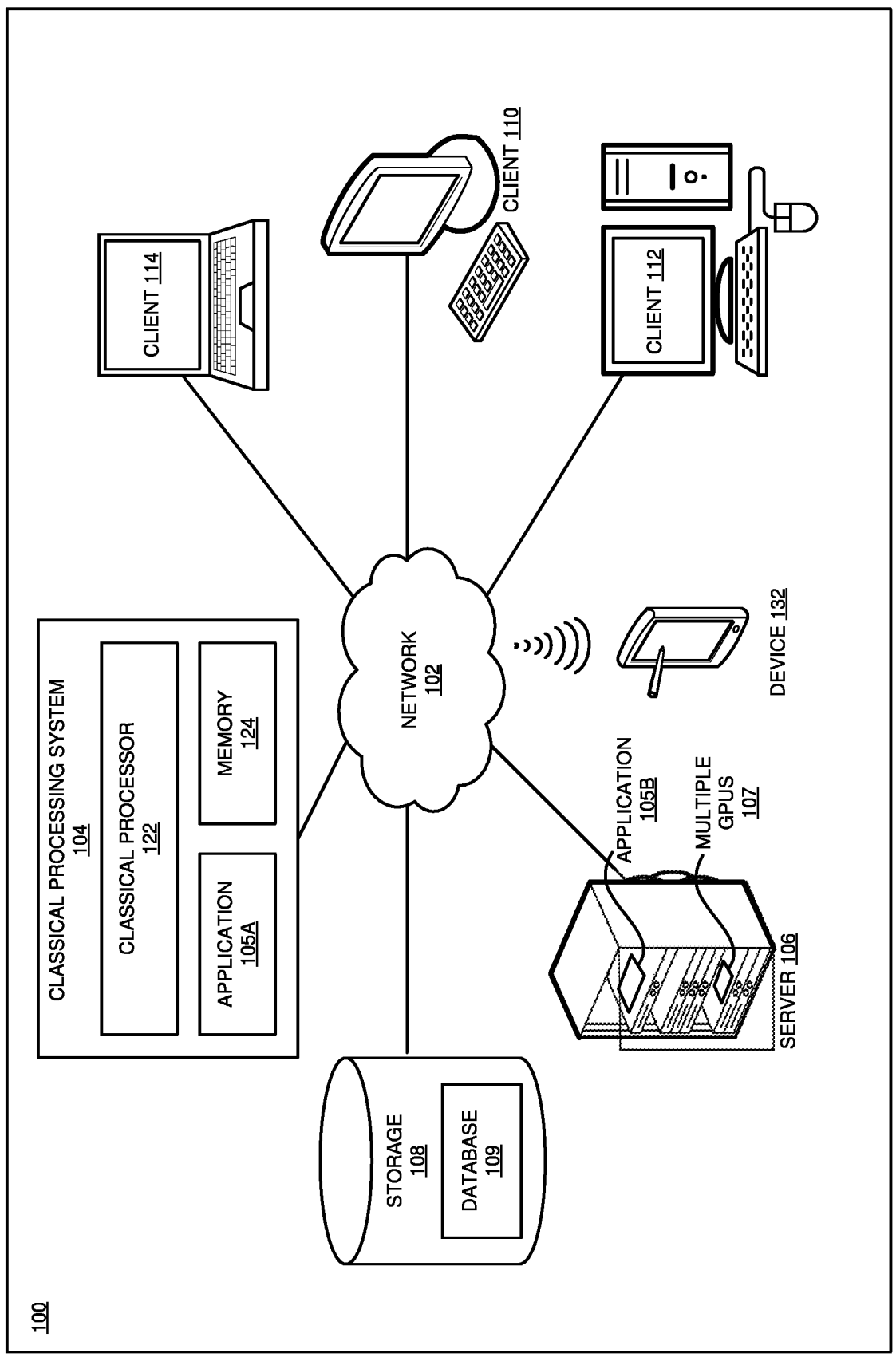
FIG. 1 depicts a block diagram of a network of data processing systems in which illustrative embodiments may be implemented.

Various AI technologies utilize deep learning neural network models to perform one or more machine learning tasks. The accuracy of the models relies upon the amount and/or type of data used to train the models. For example, the more unique data (e.g., non-duplicate data) used to train a subject model, the more accurate the subject model can become. Yet, many machine learning tasks have a limited amount of data available to train the models. Additionally, when large amounts of data are available, training the models can be time consuming. Traditional approaches attempt to resolve these problems through transfer learning, where a pre-existing, pre-trained neural network is utilized to analyze a new dataset and perform the one or more desired machine learning tasks.

However, for a given new dataset, the identification of which pre-trained neural network to select for transfer learning and the selection of hyper-parameters for further training the pre-trained neural network directly affect the performance of the desired machine learning tasks. For example, each layer is assigned a "learning rate," which is a hyper-parameter that controls how much the weights of that layer will be adjusted while the pre-trained neural network is being re-trained. Generally, the learning rate is raised to allow for greater weight change and lowered to allow for lesser weight change. Typically learning rates are configured naively at random by the user. At best, the user would leverage past experiences (or other types of learning material) to gain the intuition on what is the best value to use in setting learning rates. However, this technique is time-consuming and prone to errors.

The illustrative embodiments recognize that there is a need for improved assessments and retraining of pre-trained neural networks, including improved processes for selecting hyper-parameters how a pre-trained neural network will impact the performance of a new or modified training model. Current methods of assessing pre-trained neural networks as potential transfer-learning candidates for a new machine learning task involve brute-force assessment techniques by grid-searching all possible learning rate parameters across a network. However, such techniques are time intensive and cost prohibitive.

As used herein, the term "machine learning task" refers to any application of AI technologies that automatically and/or autonomously learns and/or improves from an experience (e.g., training data) rather than from explicit programming. For example, in some embodiments, machine learning tasks utilize one or more algorithms to facilitate supervised and/or unsupervised learning to perform tasks such as classification, regression, and/or clustering.

As used herein, the term "neural network model" refers to any computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, where data with known outcomes is inputted into the computer model, outputs regarding the data are compared to the known outcomes, and/or the weights of the computer model are autonomously adjusted based on the comparison to replicate the known outcomes.

As used herein, the term "training data" refers to any data and/or datasets used to train one or more neural network models. As a neural network model trains (e.g., utilizes more training data), the neural network model becomes increasingly accurate. Thus, trained neural network models can accurately analyze data with unknown outcomes, based on lessons learning from training data, to facilitate one or more machine learning tasks. Examples of neural network models include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), convolutional neural network ("CNN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), kohonen network ("KN"), support vector machine ("SVM"), and/or neural turing machine ("NTM").

As used herein, the term "transfer model" refers to any neural network model that is pre-trained and utilized in a transfer learning process, where new datasets can be analyzed by one or more transfer models to perform one or more machine learning tasks. Non-limiting examples of transfer models include pre-existing models chosen from a library of neural network models. Non-limiting examples of transfer models include models generated from a combination and/or alteration of one or more pre-existing, pre-trained neural network models. Additionally, non-limiting examples of transfer models include any pre-trained neural network model that is fine-tuned based on one or more characteristics of new data. Moreover, a transfer model includes any pre-trained neural network model that can be trained in one system (source domain system) and can be transferred to other systems (target domain systems) with little or no retraining.

The illustrative embodiments recognize that the presently available tools or solutions do not address these needs or provide adequate solutions for these needs. The illustrative embodiments generally address and solve the above-described problems and other problems related to assessing pre-trained neural networks for use as with a transfer learning application for a new machine learning task. In some embodiments, a pre-trained neural network assessment system receives a candidate pre-trained neural network that includes a plurality of layers, calculates divergence values for each layer, and determines learning rates for each layer based on the divergence values.

An embodiment can be implemented as a software application. The application implementing an embodiment can be configured as a modification of an existing analysis system, as a separate application that operates in conjunction with an existing analysis system, a standalone application, or some combination thereof.

In some embodiments, an automated transfer-learning fine-tuning system re-trains and refines the parameters of a neural network that was pre-trained to model a source dataset. The fine-tuning system adjusts the network weights of the pre-trained neural network and repurposes the pre-trained neural network to model a target dataset.

The source and target datasets can comprise data elements of various types, which can represent information in one or more forms of media. For example, the source and target datasets can comprise data elements such as, but not limited to: images (e.g., photos, maps, drawings, paintings, and/or the like), text (e.g., messages, books, literature, signs, encyclopedias, dictionaries, thesauruses, contracts, laws, constitutions, scripts, and/or the like), videos (e.g., video segments, movies, plays, and/or the like), audio recordings, audio signals, labels, speech, conversations, people, sports, tools, fruits, fabrics, buildings, furniture, garments, music, nature, plants, trees, fugus, foods, animals, knowledge bases, a combination thereof, and/or like. The source and target datasets can comprise any type of computer data and can represent a variety of topics. Thus, the various embodiments described herein are not limited to the analysis of a particular type and/or format of data.

In an embodiment, an application for automatic determination of learning rates for layers of a neural network receives a source dataset S and a target dataset T. In an embodiment, the application calculates a divergence vector DsT, which is composed of measures of divergence in the feature space between some statistics of feature vectors of images, for example averages of the feature vectors of images in the source and target datasets S and T.

A "feature vector" as used herein refers to one or more values in an n-dimensional vector that quantitatively provide information in the form of numerical representations of features. A non-limiting example of a feature vector includes a 500-dimensional vector of numerical features in a semantic space, where the values of the feature vector encapsulate a semantic meaning within the semantic space. In some embodiments, each layer of a neural network generates feature data representative of features of data elements passing through the neural network. An embodiment extracts the feature data from the network layers in the form of feature vectors.

The "features" as used herein will be implementation-specific, and will therefore vary depending on the type of data represented by the datasets and data elements therein. As one non-limiting example, in some embodiments the neural network is trained to recognize fonts and the dataset passing through the neural network includes font data. In such embodiments, examples of feature vectors include sets of numeric metrics corresponding to attributes and characteristics of a font, or multi-dimensional datasets that represent fonts. As another non-limiting example, in some embodiments the neural network is trained to recognized waveforms and the dataset passing through the neural network includes data representative of the morphology of waveforms. In such embodiments, examples of feature vectors include sets of numeric values that indicate signal strength or functions of the energy contained within the waveform. As yet another non-limiting example, in some embodiments the neural network is trained to identify weather patterns using datasets having feature vectors that include features extracted from measurements obtained from sensors, such as thermometers, barometers, rain gauges, anemometers, and hygrometers. Still further non-limiting examples include features extracted or derived from other data, such as deriving a driving skill metric from data collected from vehicle sensors while the driver is operating the vehicle.

In an embodiment, the application obtains a source feature vector $f_{s,n}$ for each source image $s \in S$ from each convolution layer n in a deep neural network (DNN) while each source image s makes a pass through the DNN. In some embodiments, the application then calculates the average source feature vector $f_n^S$ of the source dataset S for each layer n according to Equation (1) presented below:

$$f_n^S = \frac{1}{|S|} \sum_{s \in S} f_{s,n} \qquad (1)$$

where |S| is the cardinality of source dataset S. In an embodiment, the average source feature vector $f_n^S$ is a vector of dimension $d_n$, the number of activations of layer n, so the application calculates a normalized average source feature vector $\hat{f}_n^S$ according to Equation (2) presented below:

$$\hat{f}_n^S = \frac{f_n^S}{\Sigma f_n^S} \qquad (2)$$

where each element of the average source feature vector $f_n^S$ is divided by the sum of all the elements of the average source feature vector $f_n^S$. The resulting normalized average source feature vector $\hat{f}_n^S$ is thereby obtained such that all the elements of normalized average source feature vector $\hat{f}_n^S$ sum to 1 and therefore qualify as a discrete probability distribution.

In an embodiment, the application obtains a target feature vector $f_{t,n}$ for each target image $t \in T$ from each convolution layer n in a deep neural network (DNN) while each target image t makes a pass through the DNN. In some embodiments, the application then calculates the average target feature vector $f_n^T$ of the target dataset T for each layer n according to Equation (3) presented below:

$$f_n^T = \frac{1}{|T|} \sum_{t \in T} f_{t,n} \qquad (3)$$

where |T| is the cardinality of target dataset T. In an embodiment, the average target feature vector $f_n^T$ is a vector of dimension $d_n$, the number of activations of layer n, so the application calculates a normalized average target feature vector $\hat{f}_n^T$ according to Equation (4) presented below:

$$\hat{f}_n^T = \frac{f_n^T}{\Sigma f_n^T} \qquad (4)$$

where each element of the average target feature vector $f_n^T$ is divided by the sum of all the elements of the average target feature vector $f_n^T$. The resulting normalized average target feature vector $\hat{f}_n^T$ is thereby obtained such that all the elements of normalized average target feature vector $\hat{f}_n^T$ sum to 1 and therefore qualify as a discrete probability distribution.

In an embodiment, once the application has calculated the normalized source and target average feature vectors $\hat{f}_n^S$ and $\hat{f}_n^T$, the application calculates the divergence vector $D_{ST}$ using the symmetric Kullback-Leibler (KL) divergence (Kullback and Leibler, 1951) between the normalized source and target feature vectors $\hat{f}_n^S$ and $\hat{f}_n^T$. The normalized source and target feature vectors $\hat{f}_n^S$ and $\hat{f}_n^T$ can be represented as $p=\hat{f}_n^S$ and $q=\hat{f}_n^T$ for the sake of simplicity. In some embodiments, the application calculates the KL divergence according to Equation (5) presented below:

$$KLD(p, q) = \sum_i p(i) \log\left(\frac{p(i)}{q(i)}\right) \qquad (5)$$

In some embodiments, the application uses symmetric KL divergence calculated according to Equation (6) below:

$$\frac{KLD(p, q) + KLD(q, p)}{2} \qquad (6)$$

The KL divergence calculation results in a divergence vector D' of divergence elements d' that correspond to divergence values for respective layers of the DNN between the target dataset and the source dataset.

In the above Equation (5), index i represents a particular layer of a DNN.

In some embodiments, the application uses the divergence vector D' to calculate a learning rate for each layer. In some embodiments, the application linearly maps the divergence vector D' to values from 0 to 1, where 0=the minimum learning rate, and 1=the maximum learning rate. The larger the learning rate, the more susceptible the corresponding layer will be to change during training, whereas the smaller the learning rate, the less susceptible the corresponding layer will be to change during training. For example, in some embodiments, the application sets the largest learning rate value to 0.1 and the highest divergence rate is calculated to be 1.2, then 1.2 is mapped to the 0.1 learning rate value, and the remaining learning rate values are proportionally reduced to fit the divergence values within the desired range for learning rates.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
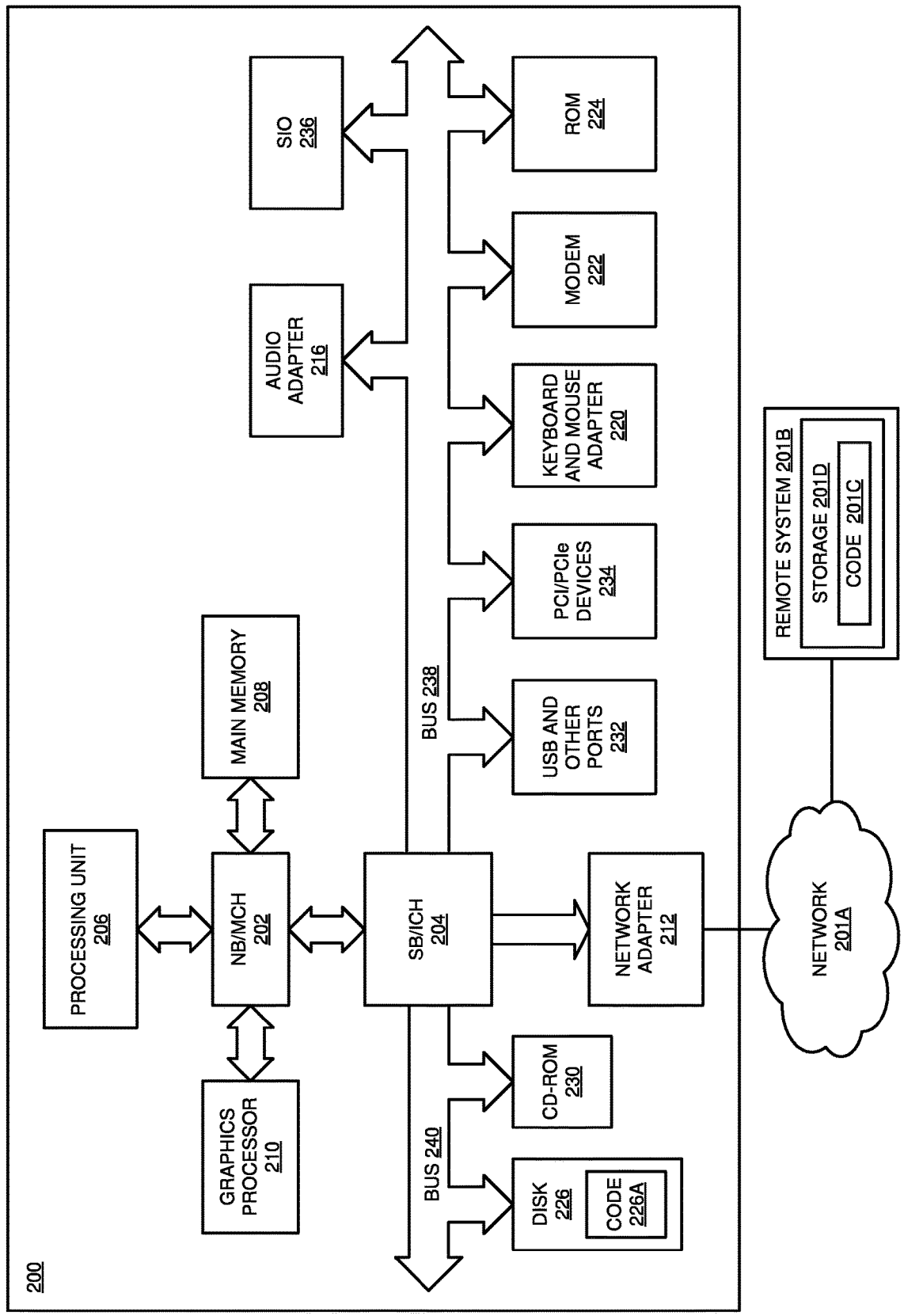
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
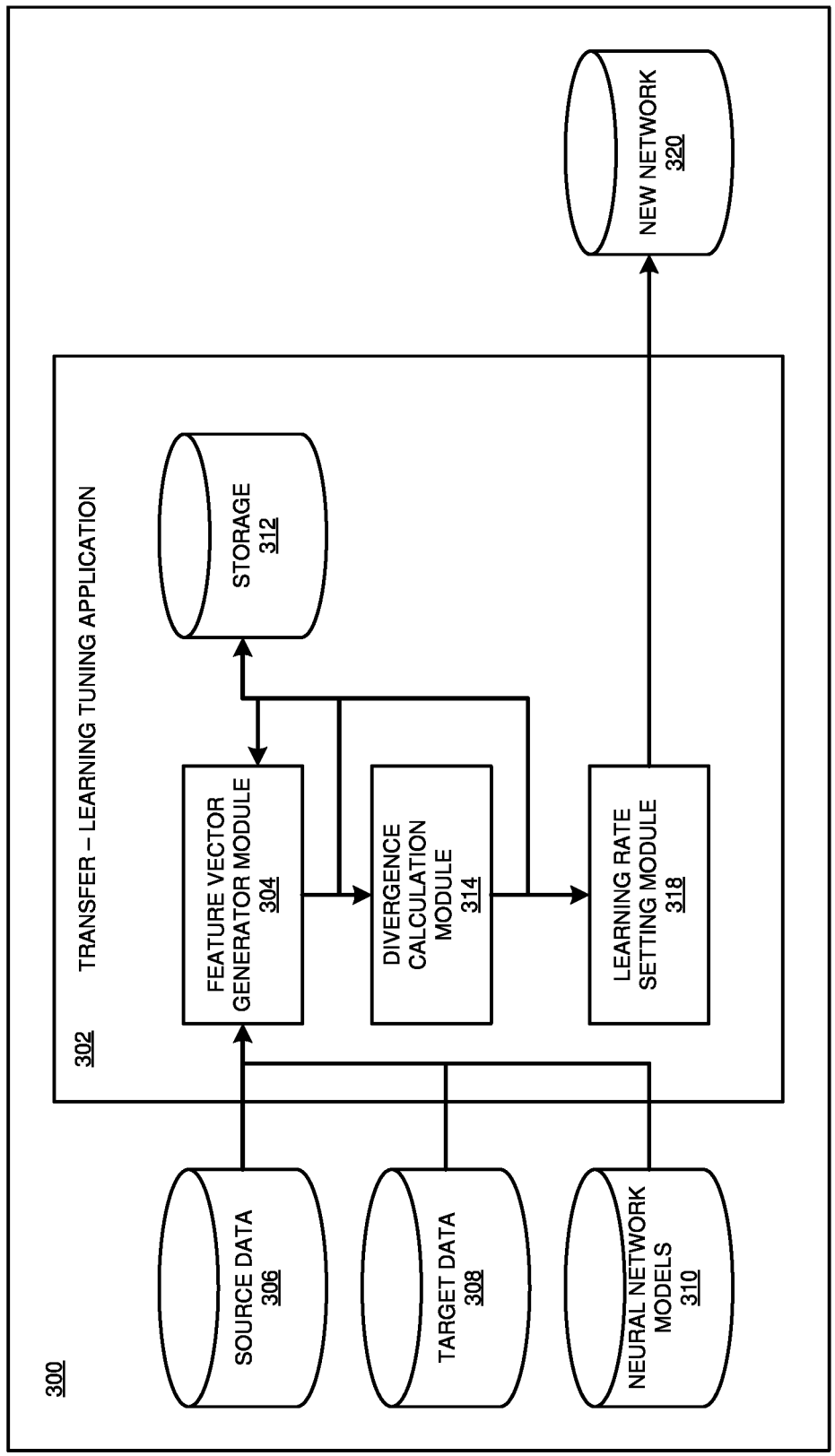
FIG. 3 depicts a block diagram of an example configuration for automated fine-tuning of a pre-trained neural network for transfer learning in accordance with an illustrative embodiment.

With reference to FIG. 3, this figure depicts a block diagram of an example configuration 300 in accordance with an illustrative embodiment. The example embodiment includes a transfer-learning tuning application 302. In a particular embodiment, application 302 is an example of application 105A/105B of FIG. 1.

In some embodiments, the application 302 includes a feature vector generator module 304, a difference calculation module 314, a learning rate range-setting module 316, and a learning rate setting module 318. In alternative embodiments, the application 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the feature vector generator module 304 receives or fetches a pre-trained neural network from neural network models storage 310 that is under consideration for transfer learning or is being fine-tuned and repurposed for transfer learning. In some embodiments, the feature vector generator module 304 also receives a source dataset from source data storage 306 and receives a target dataset from target data storage 308. In some embodiments, the source dataset comprises a plurality of source data elements and the target dataset comprises a plurality of target data elements. In an embodiment, the module 304 passes the source data elements through the pre-trained neural network to obtain a source feature vector for each source data element from each layer of the pre-trained neural network. In an embodiment, the module 304 passes the target data elements through the pre-trained neural network to obtain a target feature vector for each target data element from each layer of the pre-trained neural network.

For example, in some embodiments, the pre-trained neural network is a DNN and the source and target data elements are images, and for each image in the source and target datasets, the module obtains a feature vector from each layer of the DNN. As a non-limiting example, in an embodiment the pre-trained neural network is a DNN having 10 layers, so the module 304 obtains 10 feature vectors per data element. In such embodiments where the source dataset has 200 images as source data elements and the target dataset has 200 images as target data elements, the module 304 obtains 2000 source feature vectors and 2000 target feature vectors.

In some embodiments, the source feature vectors were previously obtained using application 302 or a different application configured to obtain the source feature vectors, and the source feature vectors are stored in source data 306. In such embodiments, the module 304 passes the target data elements through the pre-trained neural network to obtain a target feature vector for each target data element from each layer of the pre-trained neural network, and the module 304 fetches the source feature vectors from the source data storage 306.

In some embodiments, the module 304 calculates an average source feature vector and an average target feature vector for each layer of the pre-trained neural network. In some embodiments, the module 304 also calculates a normalized average source feature vector for each layer and a normalized average target feature vector for each layer. In some embodiments, the module 304 then stores the normalized average source feature vectors and the normalized average target feature vectors in data storage 312.

In some embodiments, the module 304 notifies the divergence calculation module 314 about the availability of the normalized average source feature vectors and the normalized average target feature vectors. The divergence calculation module 314 then calculates a divergence vector DsT using the symmetric Kullback-Leibler (KL) divergence between the normalized source and target feature vectors. The KL divergence calculation results in a divergence vector D' of divergence elements d' that correspond to divergence values for respective layers of the pre-trained neural network between the target dataset and the source dataset. In some embodiments, the module 314 then stores the divergence vectors in data storage 312.

In some embodiments, the module 314 notifies the learning rate setting module 318 about the availability of the divergence vectors. In some embodiments, the module 314 uses the divergence vector D' to calculate a learning rate for each layer. In some embodiments, the module 318 linearly maps the divergence vector D' to values from 0 to 1, where 0=the minimum learning rate, and 1=the maximum learning rate. The larger the learning rate, the more susceptible the corresponding layer will be to change during training, whereas the smaller the learning rate, the less susceptible the corresponding layer will be to change curing training. For example, in some embodiments, the module 318 sets the largest learning rate value to 0.1 and the highest divergence rate is calculated to be 1.2, then 1.2 is mapped to the 0.1 learning rate value, and the remaining learning rate values are proportionally reduced to fit the divergence values within the desired range for learning rates.

In some embodiments, the application 302 outputs the pre-trained neural network with the updated hyperparameters to new network memory 320. In some embodiments, the application 302 includes functionality for further training the pre-trained neural network according to the updated hyperparameters. In some such embodiments, the target data memory 308 includes target data for the further training of the pre-trained neural network.

Figure 4:
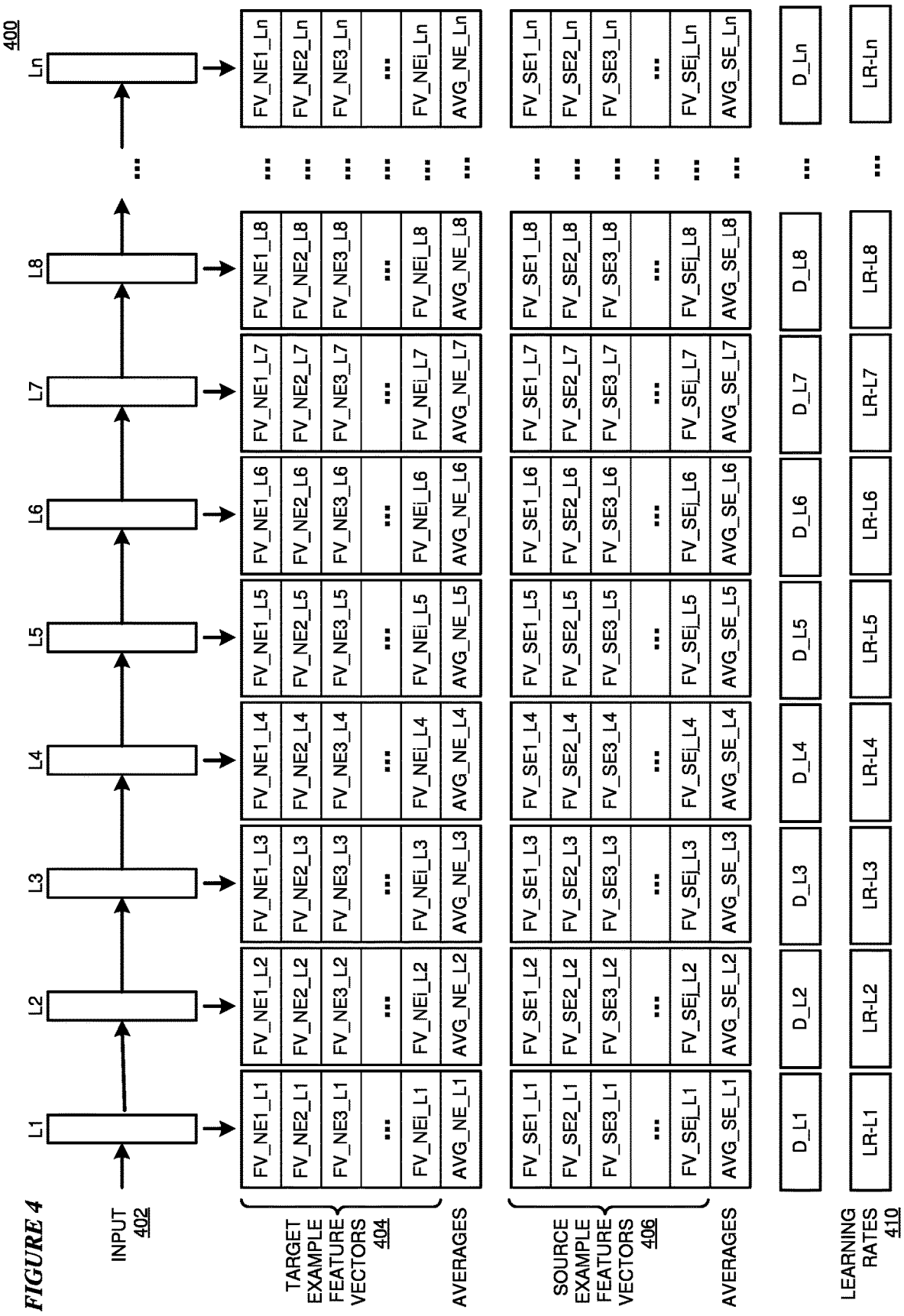
FIG. 4 depicts a schematic diagram of example data structures for automated fine-tuning of a pre-trained neural network for transfer learning in accordance with an illustrative embodiment.

With reference to FIG. 4, this figure depicts a schematic diagram of data structures for an example configuration 400 in accordance with an illustrative embodiment. The embodiment shown and described in connection with FIG. 4 is a non-limiting example of data structures associated with the transfer-learning tuning application 302 shown in FIG. 3 and the process 500 shown in FIG. 5.

In the illustrated embodiment, a pre-trained neural network 402 comprises n convolutional layers L1-Ln. In an embodiment, the application receives a target dataset having i target data elements NE1-NEi and a source dataset having j source data elements SE1-SEj.

In an embodiment, the application passes each target data element NE1-NEi through the pre-trained neural network 402. As each target data element NE1-NEi passes through each layer L1-Ln, the layers output respective feature vectors FV. For example, as layer L1 passes target data element NE1, the application obtains a target feature vector FV_NE1_L1 for target data element NE1 from layer L1, feature vector FV_NE1_L2 for data element NE1 from layer L2, and so on through feature vector FV_NE1_Ln for target data element NE1 from the last layer Ln. This is repeated for all of the target data elements NE1-NEi, with the last target feature vector being FV_NEi_Ln for target data element NEi from layer Ln.

In an embodiment, the application passes each source data element SE1-SEj through the pre-trained neural network 402. As each source data element SE1-SEj passes through each layer L1-Ln, the layers output respective feature vectors FV. For example, as layer L1 passes source data element SE1, the application obtains a source feature vector FV_SE1_L1 for source data element SE1 from layer L1, feature vector FV_SE1_L2 for source data element SE1 from layer L2, and so on through feature vector FV_SE1_Ln for source data element SE1 from the last layer Ln. This is repeated for all of the source data elements SE1-SEj, with the last source feature vector being FV_SEj_Ln for source data element SEj from layer Ln.

In some embodiments, the application calculates average target feature vectors AVG_NE_L1-AVG_NE_Ln and average source feature vectors AVG_SE_L1-AVG_SE_Ln for respective layers of the pre-trained neural network. For example, the application averages target feature vectors for the first layer FV_NE1_L1-FV_NEi_L1 to calculate the first average target feature vector AVG_NE_L1, and the application averages source feature vectors for the first layer FV_SE1_L1-FV_SEj_L1 to calculate the first average source feature vector AVG_SE_L1 and so on. In some embodiments, the application calculates divergence vectors D_L1-D_Ln for each of the layers using the average target feature vectors AVG_NE_L1-AVG_NE_Ln and average source feature vectors AVG_SE_L1-AVG_SE_Ln or normalized versions thereof. In some embodiments, the application calculates learning rates LR_L1-LR_Ln for each of the layers using the divergence vectors D_L1-D_Ln. In embodiments that directly use the average source feature vectors and average target feature vectors for divergence calculations without normalizing them, the divergence vectors can be calculated using any other measure of divergence between two high dimensional vectors, such as Euclidean distance, cosine similarity or any other desired measure. In embodiments that utilize normalized versions of the source feature vectors, the KL divergence measure can be used to calculate divergence vectors, or alternatively the divergence vectors can be calculated using any other measure of divergence between two high dimensional vectors, such as Euclidean distance, cosine similarity or any other desired measure.

Figure 5:
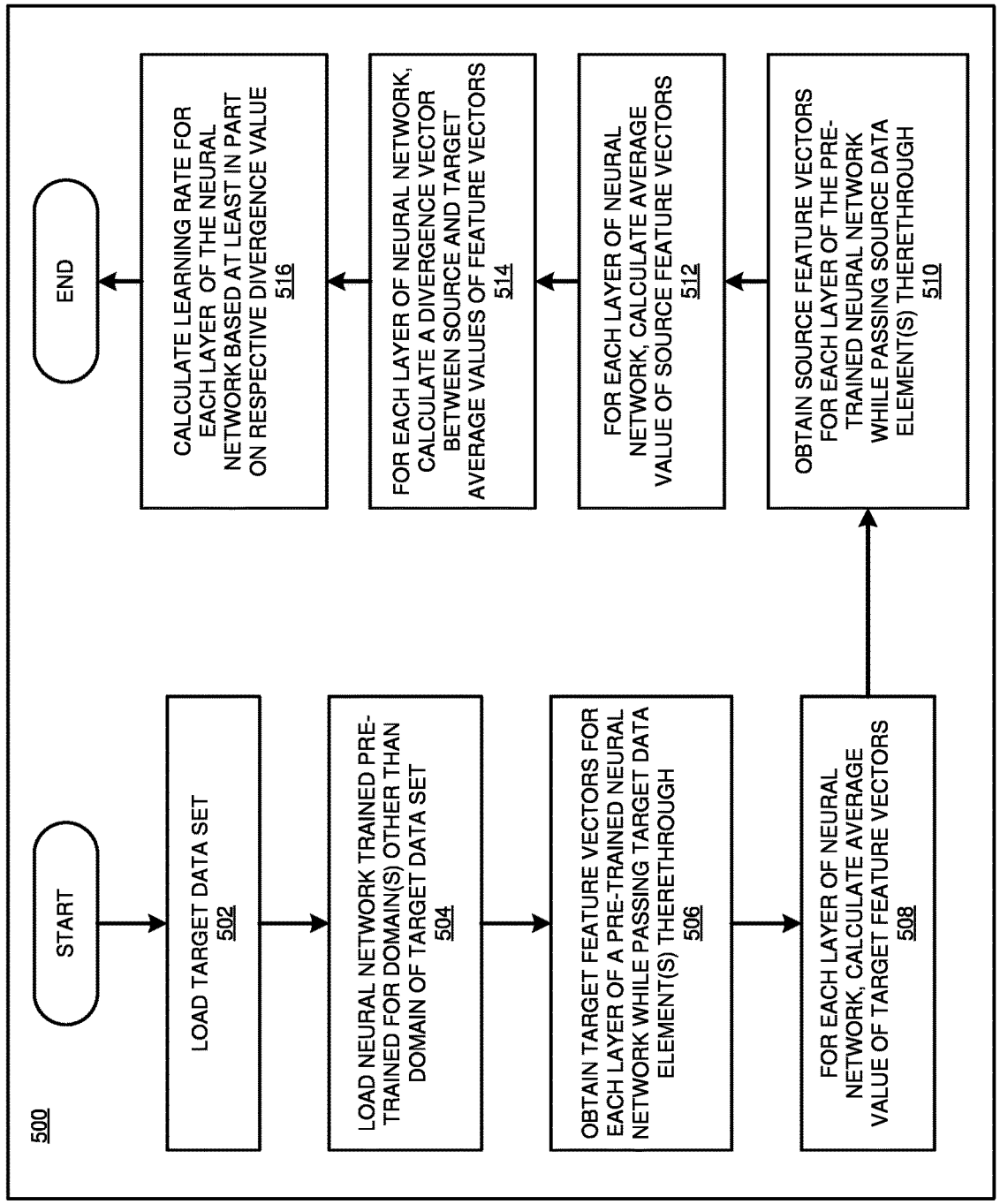
FIG. 5 depicts a flowchart of an example process for automated fine-tuning of a pre-trained neural network for transfer learning in accordance with an illustrative embodiment.

With reference to FIG. 5 this figure depicts a flowchart of an example process 500 for automated fine-tuning of a pre-trained neural network for transfer learning in accordance with an illustrative embodiment. In a particular embodiment, the application 302 carries out the process 500.

In an embodiment, at block 502, the process obtains a target data set. For example, in an embodiment, the target data set includes data elements in a domain for which a neural network is sought or is being configured for training. Next, at block 504, the process loads a pre-trained neural network trained for a domain or domains other than that of the target dataset. Next, at block 506, the process obtains target feature vectors for each layer of a pre-trained neural network while passing target data element(s) therethrough. At block 508, for each layer of neural network, the process calculates an average value of target feature vectors. Next, at block 510, the process obtains source feature vectors for each layer of the pre-trained neural network. In some embodiments, the process obtains source feature vectors for each layer of the pre-trained neural network while passing source data element(s) therethrough. In some embodiments, the process obtains previously-prepared source feature vectors and/or average values of source feature vectors for each layer of the pre-trained neural network from memory. For example, in some embodiments, the previously-prepared source feature vectors and/or average values of source feature vectors were obtained and stored in memory prior to the beginning of the process shown in FIG. 5 or prior to the application receiving the target data set. Next, at block 512, for each layer of neural network, the process calculates an average value of source feature vectors. For embodiments that include obtaining the average values of the source feature vectors from memory at block 510, the process skips block 512. Next, at block 514, the process calculates a divergence vector between the source and target average values of the feature vectors. In some embodiments, the process calculates the divergence vectors using normalized average values of the source and target feature vectors. Finally, at block 516, the process calculates a learning rate for each layer of the neural network based at least in part on a respective divergence value. The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method for re-training a pre-trained neural network comprising:
   fetching a pre-trained neural network from a library of pre-trained neural networks, wherein the pre-trained neural network has been pre-trained on a source dataset;
   adjusting a learning rate for each layer of a set of layers of the pre-trained neural network, wherein the pre-trained neural network comprises at least a first layer and a second layer, wherein adjusting the learning rate for each layer comprises:
   setting, by a processor, a learning rate range for the pre-trained neural network, wherein the learning rate range comprises a largest learning rate;
   obtaining, by the processor, a first target feature vector from the first layer of the pre-trained neural network responsive to a target dataset passing through the first layer;
   obtaining, by the processor, a first source feature vector associated with the first layer of the pre-trained neural network responsive to the source dataset passing through the first layer;
   obtaining, by the processor, a second target feature vector from the second layer of the pre-trained neural network responsive to a second target dataset passing through the second layer, wherein the second target dataset corresponds to an output dataset of the target dataset having passed through the first layer
   obtaining, by the processor, a second source feature vector from the second layer of the pre-trained neural network responsive to a second source dataset passing through the second layer, wherein the second source dataset corresponds to an output dataset of the target dataset having passed through the first layer;
   obtaining, by the processor, a first divergence between the first target feature vector and the first source feature vector;
   obtaining, by the processor, a second divergence between the second target feature vector and the second source feature vector;
   obtaining, by the processor, a highest divergence and a non-highest divergence by comparing the first divergence to the second divergence;
   identifying, by the processor, one of at least the first layer and the second layer corresponding to the highest divergence as a highest divergence layer;
   setting, by the processor, a first learning rate for the highest divergence layer, wherein the first learning rate for the highest divergence layer is the largest learning rate of the learning rate range;
   identifying, by the processor, one of at least the first layer and the second layer corresponding to the non-highest divergence as a non-highest divergence layer;
   setting, by the processor, a second learning rate for the non-highest divergence layer, wherein the second learning rate for the non-highest divergence layer is proportional to the highest learning rate with a ratio of the non-highest divergence over the highest divergence;
   re-training, by the processor, the pre-trained neural network for the target dataset, wherein the retraining comprises:
   adjusting, by the processor, a first set of weights of the highest divergence layer according to the first learning rate upon inputting of the target dataset; and
   adjusting, by the processor, a second set of weights of the non-highest divergence layer according to the second learning rate upon inputting of the target dataset.

2. The computer implemented method of claim 1, further comprising calculating, by the processor, a first target average feature vector based at least in part on the first and second target feature vectors.

3. The computer implemented method of claim 1, further comprising:
   calculating, by the processor, a first target average feature vector based at least in part on the first and second target feature vectors; and
   calculating, by the processor, a first source average feature vector based at least in part on the first and second source feature vectors.

4. The computer implemented method of claim 1, further comprising:
   obtaining, by the processor, a third target feature vector from the second layer of the pre-trained neural network, responsive to a first second-layer target dataset passing through the second layer, wherein the first second layer target dataset corresponds to an output dataset of the first layer subsequent to the first target dataset having passed through the first layer; and
   obtaining, by the processor, a fourth target feature vector from the second layer of the pre-trained neural network responsive to a second second-layer target dataset passing through the second layer; wherein the second second-layer target dataset corresponds to an output dataset of the first layer subsequent to the second target dataset having passed through the first layer.

5. The computer implemented method of claim 4, further comprising:
   calculating, by the processor, a first target average feature vector based at least in part on the first and second target feature vectors;
   calculating, by the processor, a first source average feature vector based at least in part on the first and second source feature vectors; and
   calculating, by the processor, a second target average feature vector based at least in part on the third and fourth target feature vectors.

6. The computer implemented method of claim 4, further comprising:
   obtaining, by the processor, a third source feature vector associated with the second layer of the pre-trained neural network; and
   obtaining, by the processor, a fourth source feature vector associated with the second layer of the pre-trained neural network.

7. The computer implemented method of claim 6, further comprising:
 calculating, by the processor, a first target average feature vector based at least in part on the first and second target feature vectors;
 calculating, by the processor, a first source average feature vector based at least in part on the first and second source feature vectors;
 calculating, by the processor, a second target average feature vector based at least in part on the third and fourth target feature vectors; and
 calculating, by the processor, a second source average feature vector based at least in part on the third and fourth source feature vectors.

8. The computer implemented method of claim 7, further comprising:
 calculating, by the processor, first and second normalized target average feature vectors; and
 calculating, by the processor, first and second normalized source average feature vectors.

9. The computer implemented method of claim 8, wherein the calculating of the first divergence value comprises calculating a divergence between the first normalized target average feature vector and the first normalized source average feature vector.

10. The computer implemented method of claim 9, wherein the obtaining of the first, second, third, and fourth source feature vector includes obtaining the first and second source feature vectors from the first layer of the pre-trained neural network responsive to respective first and second source data elements of a source dataset passing through the first layer, and includes obtaining the third and fourth source feature vectors from the second layer of the pre-trained neural network responsive to the respective first and second source data elements of the source dataset passing through the second layer.

11. The computer implemented method of claim 9, wherein the obtaining of the first, second, third, and fourth source feature vectors includes obtaining the first, second, third, and fourth source feature vectors from memory.

12. A computer implemented method for re-training a pre-trained neural network comprising:
 fetching a pre-trained neural network from a library of pre-trained neural networks, wherein the pre-trained neural network has been pre-trained on a source dataset;
 adjusting a learning rate for each layer of a set of layers of the pre-trained neural network, wherein the pre-trained neural network comprises at least a first layer and a second layer, wherein adjusting the learning rate for each layer comprises:
 setting, by a processor, a learning rate range for the pre-trained neural network, wherein the learning rate range comprises a largest learning rate;
 obtaining, by the processor, a first target feature vector from the first layer of the pre-trained neural network responsive to a target dataset passing through the first layer;
 obtaining, by the processor, a first source feature vector associated with the first layer of the pre-trained neural network responsive to the source dataset passing through the first layer;
 obtaining, by the processor, a second target feature vector from the second layer of the pre-trained neural network responsive to a second target dataset passing through the second layer, wherein the second target dataset corresponds to an output dataset of the target dataset having passed through the first layer
 obtaining, by the processor, a second source feature vector from the second layer of the pre-trained neural network responsive to a second source dataset passing through the second layer, wherein the second source dataset corresponds to an output dataset of the target dataset having passed through the first layer;
 obtaining, by the processor, a first divergence between the first target feature vector and the first source feature vector;
 obtaining, by the processor, a second divergence between the second target feature vector and the second source feature vector;
 obtaining, by the processor, a highest divergence and a non-highest divergence by comparing the first divergence to the second divergence;
 identifying, by the processor, one of at least the first layer and the second layer corresponding to the highest divergence as a highest divergence layer;
 setting, by the processor, a first learning rate for the highest divergence layer, wherein the first learning rate for the highest divergence layer is the largest learning rate of the learning rate range;
 identifying, by the processor, one of at least the first layer and the second layer corresponding to the non-highest divergence as a non-highest divergence layer;
 setting, by the processor, a second learning rate for the non-highest divergence layer, wherein the second learning rate for the non-highest divergence layer is proportional to the highest learning rate with a ratio of the non-highest divergence over the highest divergence;
 re-training, by the processor, the pre-trained neural network for the target dataset, wherein the retraining comprises:
 adjusting, by the processor, a first set of weights of the highest divergence layer according to the first learning rate upon inputting of the target dataset; and
 adjusting, by the processor, a second set of weights of the non-highest divergence layer according to the second learning rate upon inputting of the target dataset.

13. The computer usable program product of claim 12, wherein the stored program instructions are stored in a computer readable storage medium in a data processing system, and wherein the stored program instructions are transferred over a network from a remote data processing system.

14. The computer usable program product of claim 12, wherein the stored program instructions are stored in a computer readable storage medium in a server data processing system, and wherein the stored program instructions are downloaded over a network to a remote data processing system for use in a computer readable storage medium associated with the remote data processing system, further comprising:
 program instructions to meter use of the computer usable code associated with the request; and
 program instructions to generate an invoice based on the metered use.

15. The computer usable program product of claim 12, wherein the obtaining of the first source feature vector includes obtaining the first source feature vector from memory.

* * * * *